(12) United States Patent
Endo

(10) Patent No.: US 12,703,152 B2
(45) Date of Patent: Aug. 11, 2026

(54) MANAGEMENT METHOD FOR THREE-DIMENSIONAL SHAPING APPARATUS, INFORMATION PROCESSING APPARATUS, AND NON-TRANSITORY COMPUTER-READABLE STORAGE MEDIUM STORING COMPUTER PROGRAM

(71) Applicant: SEIKO EPSON CORPORATION, Tokyo (JP)

(72) Inventor: Wataru Endo, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 312 days.

(21) Appl. No.: 18/476,494

(22) Filed: Sep. 28, 2023

(65) Prior Publication Data

US 2024/0109254 A1 Apr. 4, 2024

(30) Foreign Application Priority Data

Sep. 29, 2022 (JP) ................................ 2022-156330

(51) Int. Cl.
*B29C 64/386* (2017.01)
*B29C 64/153* (2017.01)
*B33Y 50/00* (2015.01)

(52) U.S. Cl.
CPC ............ *B29C 64/386* (2017.08); *B33Y 50/00* (2014.12); *B29C 64/153* (2017.08)

(58) Field of Classification Search
None
See application file for complete search history.

(56) References Cited

U.S. PATENT DOCUMENTS

2006/0095152 A1* 5/2006 Loughran .......... G05B 19/4099 700/182
2013/0187925 A1 7/2013 Iwata et al.
2017/0023929 A1 1/2017 Matsuda
2017/0153858 A1 6/2017 Sato
2017/0173888 A1 6/2017 Thomas-Lepore et al.
2017/0173889 A1 6/2017 Thomas-Lepore et al.

FOREIGN PATENT DOCUMENTS

JP 2004-155116 A 6/2004
JP 2013-146999 A 8/2013
JP 2017-027267 A 2/2017
JP 2017-094692 A 6/2017
WO 2017-221884 A1 12/2017

* cited by examiner

*Primary Examiner* — Sean Shechtman
(74) *Attorney, Agent, or Firm* — Harness, Dickey & Pierce, P.L.C.

(57) ABSTRACT

A management method for a three-dimensional shaping apparatus includes an output step for referring to a storage unit that stores time information representing time, operation information including information representing a shaping time for a model in the three-dimensional shaping apparatus, and user information corresponding to the operation information or the three-dimensional shaping apparatus and outputting the time information, the operation information, and the user information. The operation information is stored in the storage unit in association with the time information. The user information includes at least one of face information and name information of a user. In the output step, the time information is output in a designated scale or a designated time zone.

8 Claims, 14 Drawing Sheets

10
400
INFORMATION PROCESSING APPARATUS
100
SHAPING APPARATUS B ABS 200°C
SHAPING APPARATUS G
SHAPING APPARATUS F
SHAPING APPARATUS H
SHAPING APPARATUS E
SHAPING APPARATUS I
SHAPING APPARATUS D PEEK 400°C
SHAPING APPARATUS C PP 100°C
SHAPING APPARATUS A ABS 200°C
SHAPING APPARATUS J

FIG. 9

| | CUMULATIVE USE TIME | CUMULATIVE USED MATERIAL AMOUNT | CUMULATIVE NUMBER OF TIMES OF CLEANING | CUMULATIVE USED ELECTRIC ENERGY AMOUNT | NUMBER OF SIMULTANEOUSLY USABLE APPARATUSES | MODEL-REMOVABLE WAITING TIME |
|---|---|---|---|---|---|---|
| USER A | APPARATUS A: x [h]<br>APPARATUS B: y [h]<br>APPARATUS C: z [h] | APPARATUS A: x [g]<br>APPARATUS B: y [g]<br>APPARATUS C: z [g] | APPARATUS A: x [TIME]<br>APPARATUS B: y [TIME]<br>APPARATUS C: z [TIME] | APPARATUS A: x [kwh]<br>APPARATUS B: y [kwh]<br>APPARATUS C: z [kwh] | 3 | APPARATUS A: x [min]<br>APPARATUS B: y [min]<br>APPARATUS C: z [min] |
| USER B | APPARATUS A: x [h]<br>APPARATUS B: y [h]<br>APPARATUS C: z [h] | APPARATUS A: x [g]<br>APPARATUS B: y [g]<br>APPARATUS C: z [g] | APPARATUS A: x [TIME]<br>APPARATUS B: y [TIME]<br>APPARATUS C: z [TIME] | APPARATUS A: x [kwh]<br>APPARATUS B: y [kwh]<br>APPARATUS C: z [kwh] | 3 | APPARATUS A: x [min]<br>APPARATUS B: y [min]<br>APPARATUS C: z [min] |
| USER C | APPARATUS A: x [h]<br>APPARATUS B: y [h]<br>APPARATUS C: z [h] | APPARATUS A: x [g]<br>APPARATUS B: y [g]<br>APPARATUS C: z [g] | APPARATUS A: x [TIME]<br>APPARATUS B: y [TIME]<br>APPARATUS C: z [TIME] | APPARATUS A: x [kwh]<br>APPARATUS B: y [kwh]<br>APPARATUS C: z [kwh] | 2 | APPARATUS A: x [min]<br>APPARATUS B: y [min]<br>APPARATUS C: z [min] |

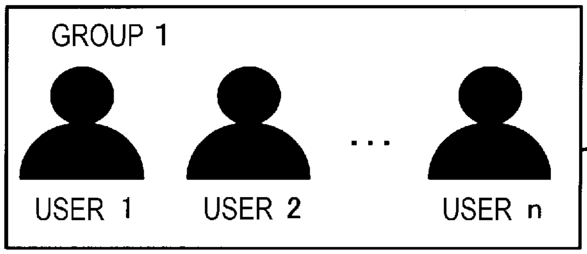

- CUMULATIVE USE TIME
- CUMULATIVE USED MATERIAL AMOUNT
- CUMULATIVE NUMBER OF TIMES OF CLEANING
- CUMULATIVE USED ELECTRIC ENERGY AMOUNT
- NUMBER OF SIMULTANEOUSLY USABLE APPARATUSES
- MODEL-REMOVABLE WAITING TIME

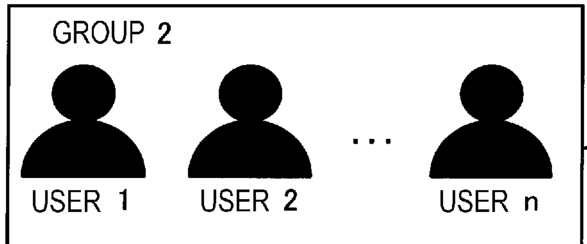

- CUMULATIVE USE TIME
- CUMULATIVE USED MATERIAL AMOUNT
- CUMULATIVE NUMBER OF TIMES OF CLEANING
- CUMULATIVE USED ELECTRIC ENERGY AMOUNT
- NUMBER OF SIMULTANEOUSLY USABLE APPARATUSES
- MODEL-REMOVABLE WAITING TIME

⋮

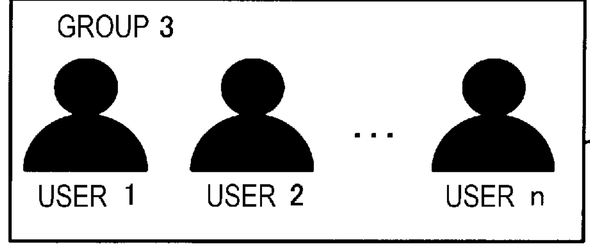

- CUMULATIVE USE TIME
- CUMULATIVE USED MATERIAL AMOUNT
- CUMULATIVE NUMBER OF TIMES OF CLEANING
- CUMULATIVE USED ELECTRIC ENERGY AMOUNT
- NUMBER OF SIMULTANEOUSLY USABLE APPARATUSES
- MODEL-REMOVABLE WAITING TIME

*FIG. 11*

| | USAGE CHARGE | CARBON DIOXIDE GAS EMISSION |
|---|---|---|
| USER A | x[YEN] | x[kg] |
| USER B | y[YEN] | y[kg] |
| USER C | z[YEN] | z[kg] |

Figure 12:
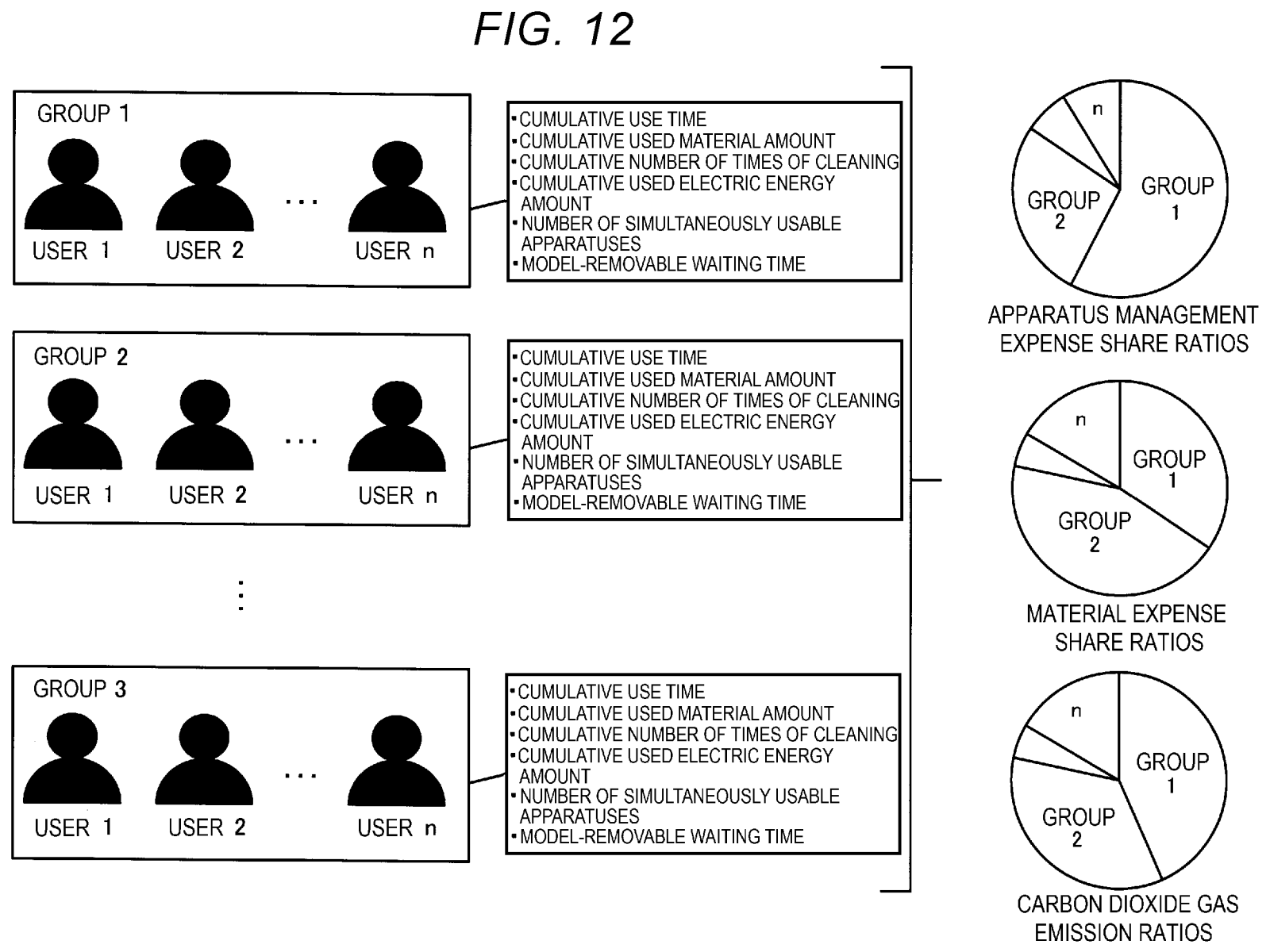

GROUP 1
USER 1
USER 2
USER n

- CUMULATIVE USE TIME
- CUMULATIVE USED MATERIAL AMOUNT
- CUMULATIVE NUMBER OF TIMES OF CLEANING
- CUMULATIVE USED ELECTRIC ENERGY AMOUNT
- NUMBER OF SIMULTANEOUSLY USABLE APPARATUSES
- MODEL-REMOVABLE WAITING TIME

GROUP 2
USER 1
USER 2
USER n

- CUMULATIVE USE TIME
- CUMULATIVE USED MATERIAL AMOUNT
- CUMULATIVE NUMBER OF TIMES OF CLEANING
- CUMULATIVE USED ELECTRIC ENERGY AMOUNT
- NUMBER OF SIMULTANEOUSLY USABLE APPARATUSES
- MODEL-REMOVABLE WAITING TIME

GROUP 3
USER 1
USER 2
USER n

- CUMULATIVE USE TIME
- CUMULATIVE USED MATERIAL AMOUNT
- CUMULATIVE NUMBER OF TIMES OF CLEANING
- CUMULATIVE USED ELECTRIC ENERGY AMOUNT
- NUMBER OF SIMULTANEOUSLY USABLE APPARATUSES
- MODEL-REMOVABLE WAITING TIME

GROUP 1
GROUP 2
n
APPARATUS MANAGEMENT EXPENSE SHARE RATIOS

GROUP 1
GROUP 2
n
MATERIAL EXPENSE SHARE RATIOS

GROUP 1
GROUP 2
n
CARBON DIOXIDE GAS EMISSION RATIOS

| | USAGE CHARGE CALCULATION | MAINTENANCE PERIOD CALCULATION | APPARATUS USE LIMITATION | NUMBER OF APPARATUSES IN USE LIMITATION | REMOVAL USER LIMITATION RELEASE | CARBON DIOXIDE GAS EMISSION CALCULATION |
|---|---|---|---|---|---|---|
| CUMULATIVE USE TIME | ○ | ○ | ○ | | | |
| CUMULATIVE USED MATERIAL AMOUNT | ○ | ○ | ○ | | | |
| CUMULATIVE NUMBER OF TIMES OF CLEANING | ○ | ○ | ○ | | | |
| CUMULATIVE USED ELECTRIC ENERGY AMOUNT | ○ | ○ | ○ | | | ○ |
| NUMBER OF SIMULTANEOUSLY USABLE APPARATUSES | | | | ○ | | |
| MODEL-REMOVABLE WAITING TIME | | | | | ○ | |

MANAGEMENT METHOD FOR THREE-DIMENSIONAL SHAPING APPARATUS, INFORMATION PROCESSING APPARATUS, AND NON-TRANSITORY COMPUTER-READABLE STORAGE MEDIUM STORING COMPUTER PROGRAM

The present application is based on, and claims priority from JP Application Serial Number 2022-156330, filed Sep. 29, 2022, the disclosure of which is hereby incorporated by reference herein in its entirety.

BACKGROUND

1. Technical Field

The present disclosure relates to a management method for a three-dimensional shaping apparatus, an information processing apparatus, and a non-transitory computer-readable storage medium storing a computer program.

2. Related Art

Concerning a technique for managing three-dimensional shaping, United States Patent Application Publication No. 2017/0173889 (Patent Literature 1) discloses an interactive platform that supports participation of a plurality of users in a shared virtual workspace. In the platform, an electronic first model received from a first user is placed in a virtual tray, an electronic second model received from a second user is placed in the virtual tray, and a view of the virtual tray obtained by obfuscating the second model is provided to the first user.

When a plurality of users use a three-dimensional shaping apparatus as disclosed in Patent Literature 1, there has been demanded a technique that can efficiently manage the three-dimensional shaping apparatus.

SUMMARY

According to a first aspect of the present disclosure, there is provided a management method for a three-dimensional shaping apparatus. The management method includes an output step for referring to a storage unit that stores time information representing time, operation information including information representing a shaping time for a model in the three-dimensional shaping apparatus, and user information corresponding to the operation information or the three-dimensional shaping apparatus and outputting the time information, the operation information, and the user information. The operation information is stored in the storage unit in association with the time information. The user information includes at least one of face information and name information of a user. In the output step, the time information is output in a designated scale or a designated time zone.

According to a second embodiment of the present disclosure, there is provided an information processing apparatus for managing a three-dimensional shaping apparatus. The information processing apparatus includes an output control unit configured to refer to a storage unit that stores time information representing time, operation information including information representing a shaping time for a model in the three-dimensional shaping apparatus, and user information corresponding to the operation information or the three-dimensional shaping apparatus and output the time information, the operation information, and the user information. The operation information is stored in the storage unit in association with the time information. The user information includes at least one of face information and name information of a user. The output control unit outputs the time information in a designated scale or a designated time zone.

According to a third aspect of the present disclosure, there is provided a non-transitory computer-readable storage medium storing a computer program for managing a three-dimensional shaping apparatus. The computer program causes a computer to realize an output function for referring to a storage unit that stores time information representing time, operation information including information representing a shaping time for a model in the three-dimensional shaping apparatus, and user information corresponding to the operation information or the three-dimensional shaping apparatus and outputting the time information, the operation information, and the user information. The operation information is stored in the storage unit in association with the time information. The user information includes at least one of face information and name information of a user. The output function outputs the time information in a designated scale or a designated time zone.

BRIEF DESCRIPTION OF THE DRAWINGS

FIG. 9 is a diagram showing an example of various kinds of information stored in a storage unit.

FIG. 10 is a diagram showing an example in which various kinds of information are managed for each of groups.

FIG. 11 is a diagram showing a list of a usage charge and carbon dioxide gas emission.

FIG. 12 is a diagram showing an example in which various ratios are calculated for each of the groups.

FIG. 15 is an explanatory diagram of removal control processing.

FIG. 16 is a diagram showing processing contents realized by various kinds of information.

DESCRIPTION OF EMBODIMENTS

A. First Embodiment

Figure 1:
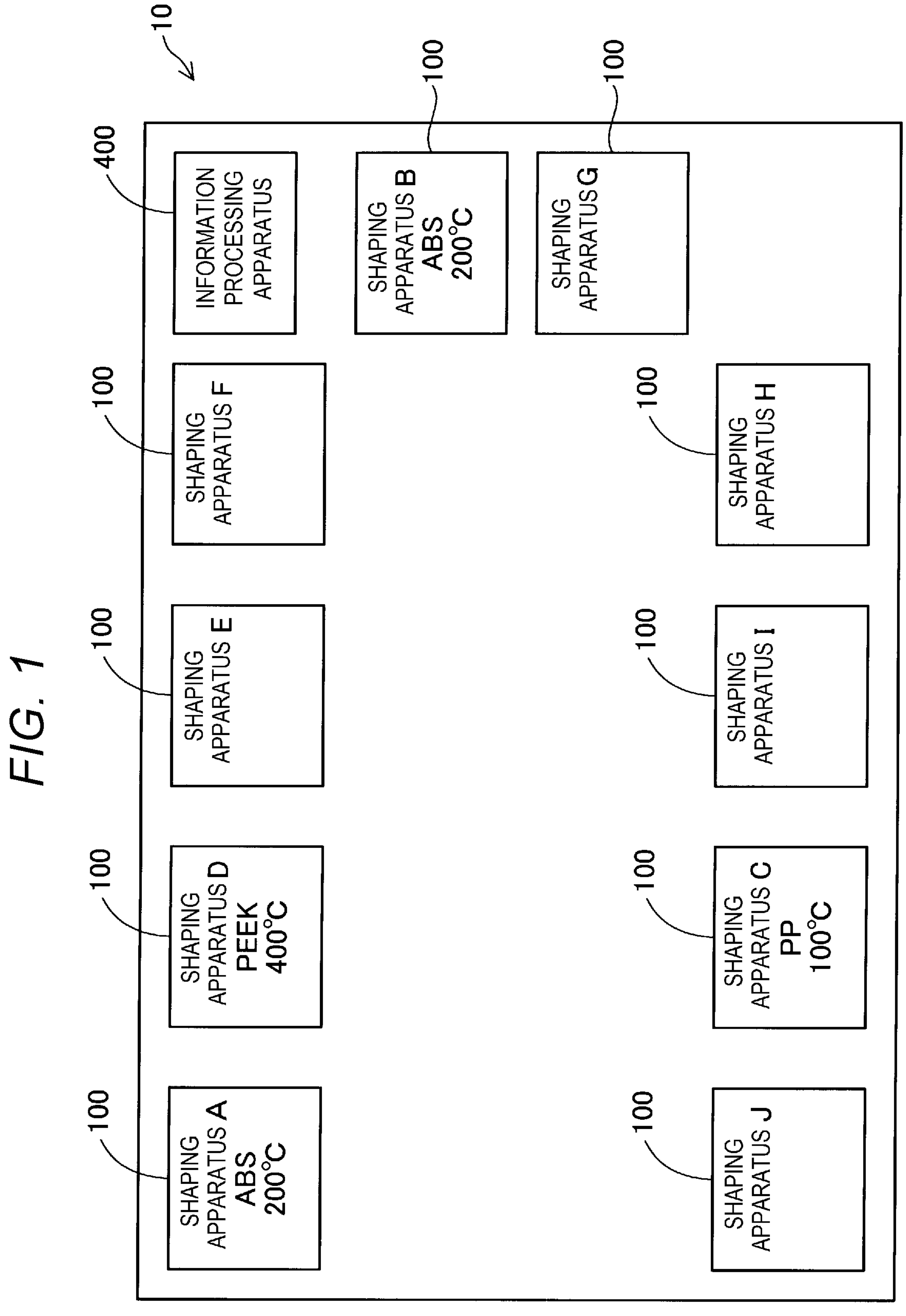
FIG. 1 is an explanatory diagram showing a schematic configuration of a three-dimensional shaping system.

FIG. 1 is an explanatory diagram showing a schematic configuration of a three-dimensional shaping system 10 in a first embodiment. The three-dimensional shaping system 10 includes a plurality of three-dimensional shaping apparatuses 100 and an information processing apparatus 400 that communicates with the three-dimensional shaping apparatuses 100. The information processing apparatus 400 and the plurality of three-dimensional shaping apparatuses 100 are capable of communicating with each other via a predetermined communication line such as the Internet or a LAN. The three-dimensional shaping system 10 is installed in a place such as a factory, a laboratory, or a commercial facility. In this embodiment, the plurality of three-dimensional shaping apparatuses 100 and the information processing apparatus 400 are installed in the same place. The three-dimensional shaping apparatuses 100 and the information processing apparatus 400 may be disposed in separate places rather than in the same place. In the following explanation, the three-dimensional shaping apparatus 100 is sometimes simply referred to as "apparatus".

Figure 2:
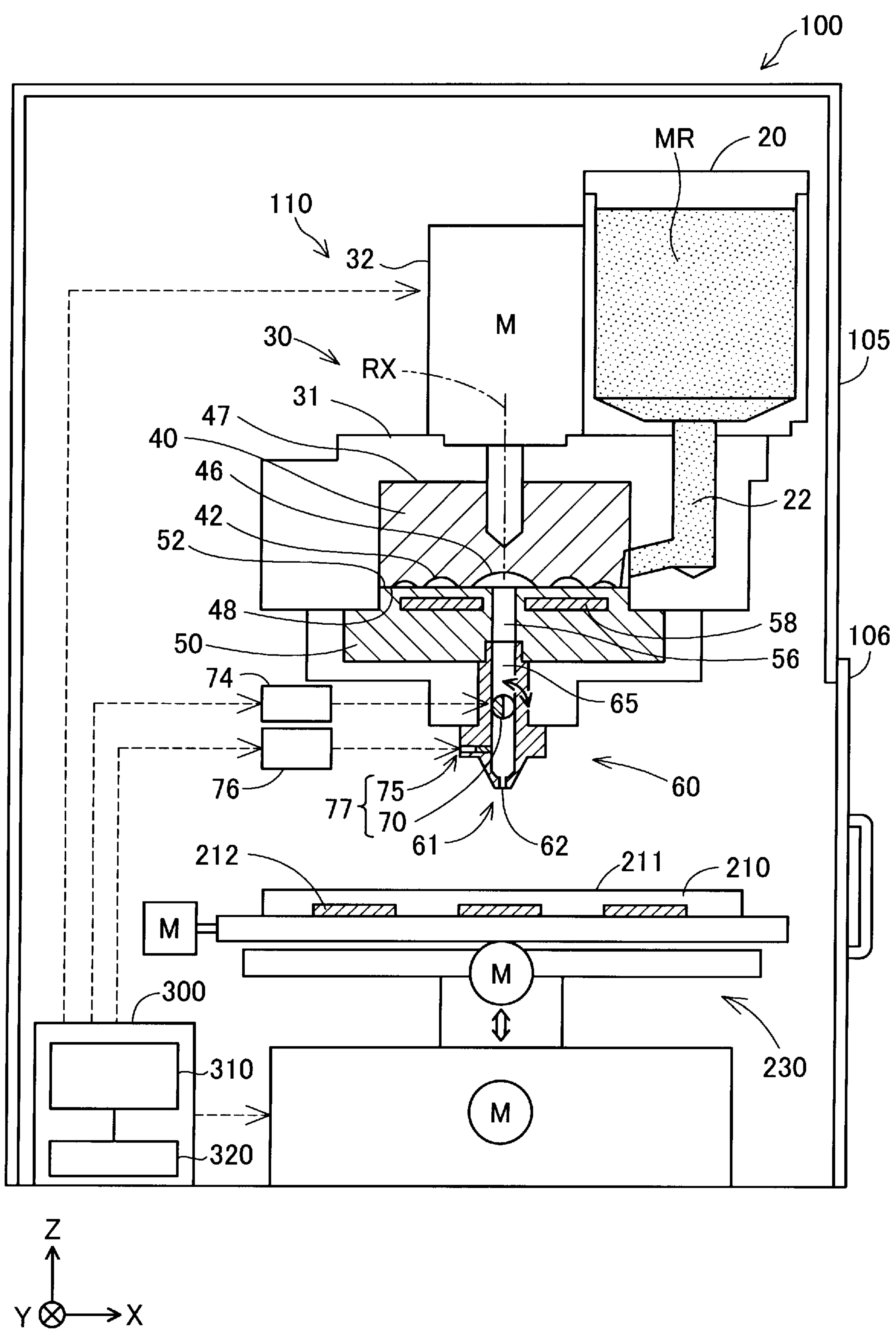
FIG. 2 is an explanatory diagram showing a schematic configuration of a three-dimensional shaping apparatus.

FIG. 2 is an explanatory diagram showing a schematic configuration of the three-dimensional shaping apparatus 100. In FIG. 2, arrows indicating X, Y, and Z directions orthogonal to one another are shown. The X direction and the Y direction are directions parallel to the horizontal plane and the Z direction is a vertical upward direction. The arrows indicating the X, Y, and Z directions are illustrated as appropriate in the other drawings as well such that illustrated directions correspond to the directions in FIG. 2. In the following explanation, when directions are specified, the directions indicated by the arrows in the figures are represented as "+" and the opposite directions of the directions are represented as "−". The positive and negative signs are used together with the direction notations. In the following explanation, the +Z direction is referred to as "upward" as well and the −Z direction is referred to as "downward" as well.

The three-dimensional shaping apparatus 100 in this embodiment is an apparatus that shapes a three-dimensional shaped object with a material extrusion method. The three-dimensional shaping apparatus 100 includes a control unit 300 for controlling units of the three-dimensional shaping apparatus 100. The control unit 300 and the information processing apparatus 400 are communicably connected to each other. In the following explanation, the three-dimensional shaped object is referred to as model as well.

The three-dimensional shaping apparatus 100 includes a shaping unit 110 that generates and discharges a shaping material, a stage 210 for shaping functioning as a base for a model, and a moving mechanism 230 that controls a discharge position of the shaping material. The shaping unit 110, the stage 210, and the moving mechanism 230 are disposed in a housing 105 included in the three-dimensional shaping apparatus 100. A door 106 is provided in the housing 105. A user can remove a model shaped in the housing 105 by opening the door 106.

The shaping unit 110 discharges a shaping material obtained by plasticizing a material in a solid state onto the stage 210 under the control by the control unit 300. The shaping unit 110 includes a material supply unit 20, which is a supply source of a raw material before being transformed into the shaping material, a plasticizing unit 30 that transforms the raw material into the shaping material, and a discharging unit 60 that discharges the shaping material.

The material supply unit 20 supplies a raw material MR to the plasticizing unit 30. The material supply unit 20 is configured by, for example, a hopper that stores the raw material MR. The material supply unit 20 is connected to the plasticizing unit 30 via a communication path 22. The raw material MR is put in the material supply unit 20 in a form of pellets, powder, or the like. As the raw material MR, a resin material such as ABS (acrylonitrile-butadiene-styrene), PEEK (polyetheretherketone), or PP (polypropylene) is used.

The plasticizing unit 30 generates a paste-like shaping material obtained by plasticizing the raw material MR supplied from the material supply unit 20 and causing the raw material MR to exhibit fluidity and guides the shaping material to the discharging unit 60. In this embodiment, "plasticizing" is a concept including melting and means changing a solid to a state having fluidity. Specifically, in the case of a material in which glass transition occurs, the plasticizing means raising the temperature of the material to a glass transition point or higher. In the case of a material in which glass transition does not occur, the plasticizing means raising the temperature of the material to the melting point or higher.

The plasticizing unit 30 includes a screw case 31, a driving motor 32, a flat screw 40, and a barrel 50. The flat screw 40 is called rotor or scroll as well. The barrel 50 is called screw facing section as well.

The flat screw 40 is housed in the screw case 31. An upper surface 47 of the flat screw 40 is coupled to the driving motor 32. The flat screw 40 rotates in the screw case 31 with a rotation driving force generated by the driving motor 32. The driving motor 32 is driven under the control by the control unit 300. The flat screw 40 may be driven by the driving motor 32 via a speed reducer.

Figure 3:
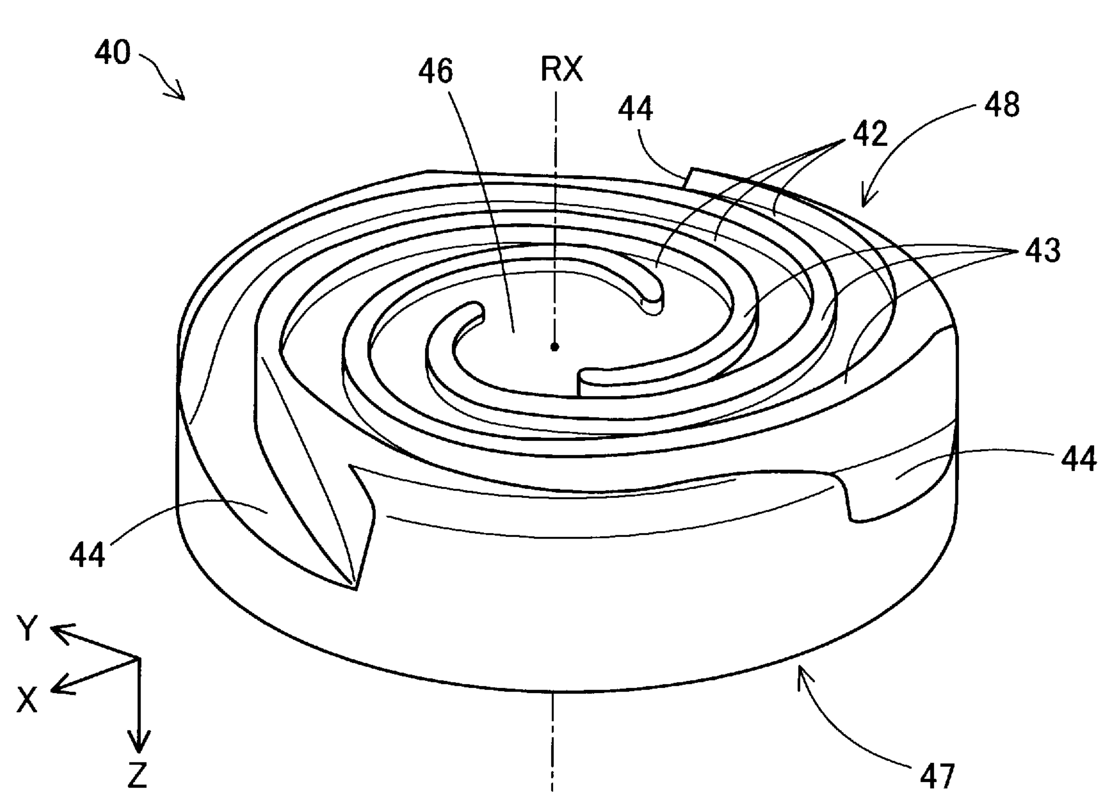
FIG. 3 is a perspective view showing a schematic configuration of a flat screw.

FIG. 3 is a perspective view showing a schematic configuration on a lower surface 48 side of the flat screw 40. To facilitate understanding of a technique, the flat screw 40 shown in FIG. 3 is shown in a state in which a positional relation between the upper surface 47 and the lower surface 48 shown in FIG. 2 is reversed in the vertical direction. The flat screw 40 has a substantially columnar shape in which length in an axial direction, which is a direction along the center axis of the substantially columnar shape, is smaller than length in a direction perpendicular to the axial direction. The flat screw 40 is disposed such that a rotation axis RX, which is a rotation center of the flat screw 40, is parallel to the Z direction.

Spiral groove sections 42 are formed on the lower surface 48, which is a surface crossing the rotation axis RX, of the flat screw 40. The communication path 22 of the material supply unit 20 explained above communicates with the groove sections 42 from a side surface of the flat screw 40. In this embodiment, three groove sections 42 are formed by being partitioned by convex ridge sections 43. The number of the groove sections 42 is not limited to three and may be one or may be two or more. The grove sections 42 are not limited to the spiral shape and may have a helical shape or an involute curve shape or may have a shape extending to draw an arc from the center toward the outer circumference.

As shown in FIG. 2, the lower surface 48 of the flat screw 40 faces an upper surface 52 of the barrel 50. A space is formed between the groove sections 42 on the lower surface 48 of the flat screw 40 and the upper surface 52 of the barrel 50. The raw material MR is supplied to the space between the flat screw 40 and the barrel 50 from the material supply unit 20 through a material inflow port 44 shown in FIG. 3.

Figure 4:
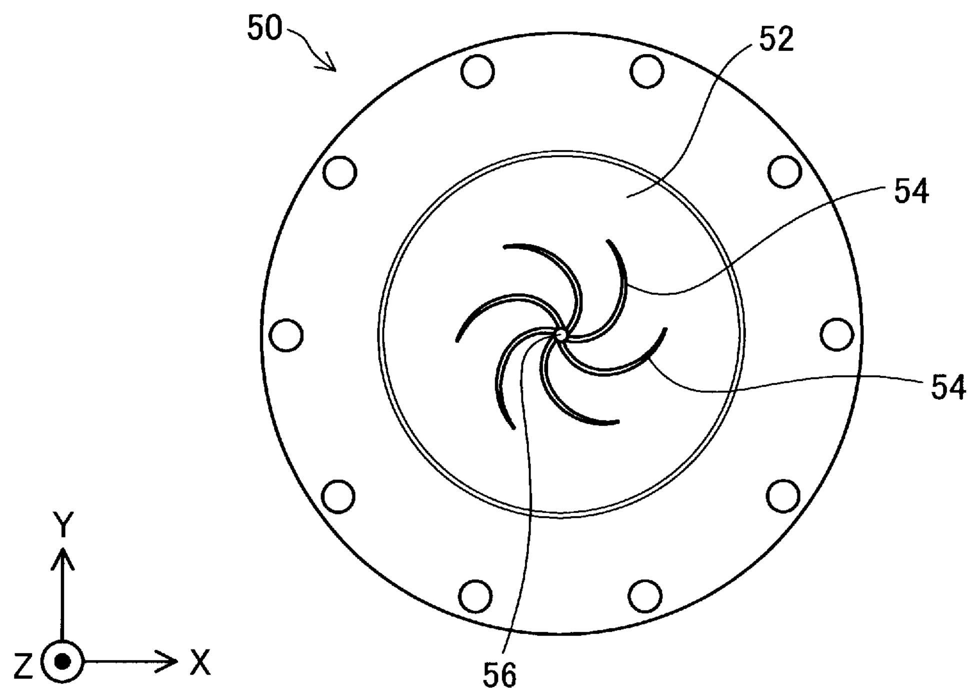
FIG. 4 is a schematic plan view of a barrel.

FIG. 4 is a schematic plan view showing the upper surface 52 side of the barrel 50. A communication hole 56 is provided in the center of the barrel 50. A plurality of guide grooves 54 connected to the communication hole 56 and spirally extending from the communication hole 56 toward the outer circumference are formed on the upper surface 52 of the barrel 50. One ends of the guide grooves 54 may not be connected to the communication hole 56. The guide grooves 54 can be omitted. As shown in FIG. 2, a barrel heater 58 for heating the raw material MR supplied into the groove sections 42 of the rotating flat screw 40 is embedded in the barrel 50.

The raw material MR supplied into the groove sections 42 of the flat screw 40 flows along the groove sections 42 according to the rotation of the flat screw 40 while being plasticized in the groove sections 42 and is guided to a center portion 46 of the flat screw 40 as the shaping material. The paste-like shaping material exhibiting fluidity, which has flowed into the center portion 46, is supplied to the discharging unit 60 via the communication hole 56 provided in the center of the barrel 50. In the shaping material, not all types of substances configuring the shaping material have to be plasticized. The shaping material only has to be transformed into a state having fluidity as a whole by at least a part of the types of the substances among the substances configuring the shaping material being plasticized.

The discharging unit 60 shown in FIG. 2 includes a nozzle 61 that discharges the shaping material, a flow path 65 for the shaping material provided between the flat screw 40 and a nozzle opening 62, and a discharge control unit 77 that controls the discharge of the shaping material.

The nozzle 61 is connected to the communication hole 56 of the barrel 50 through the flow path 65. The nozzle 61 discharges the shaping material generated in the plasticizing unit 30 from the nozzle opening 62 at the distal end of the nozzle 61 toward the stage 210.

The discharge control unit 77 includes a discharge adjusting unit 70 that opens and closes the flow path 65 and a suction unit 75 that sucks the shaping material and temporarily stores the shaping material.

The discharge adjusting unit 70 is provided in the flow path 65 and rotates in the flow path 65 to thereby change an opening degree of the flow path 65. In this embodiment, the discharge adjusting unit 70 is configured by a butterfly valve. The discharge adjusting unit 70 is driven by a first driving unit 74 under the control by the control unit 300. The first driving unit 74 is configured by, for example, a stepping motor. The control unit 300 can adjust a flow rate of the shaping material flowing from the plasticizing unit 30 to the nozzle 61, that is, a discharge amount of the shaping material discharged from the nozzle 61 by controlling a rotation angle of the butterfly valve using the first driving unit 74. The discharge adjusting unit 70 is capable of adjusting the discharge amount of the shaping material and capable of controlling ON and OFF of outflow of the shaping material The suction unit 75 is connected between the discharge adjusting unit 70 and the nozzle opening 62 in the flow path 65. When the discharge of the shaping material from the nozzle 61 is stopped, the suction unit 75 temporarily sucks the shaping material in the flow path 65 to thereby suppress a tailing phenomenon in which the shaping material drips to be stringy from the nozzle opening 62. In this embodiment, the suction unit 75 is configured by a plunger. The suction unit 75 is driven by a second driving unit 76 under the control by the control unit 300. The second driving unit 76 is configured by, for example, a stepping motor and a rack and pinion mechanism that converts a rotation force of the stepping motor into a translational motion of the plunger.

The stage 210 is disposed in a position facing the nozzle opening 62 of the nozzle 61. In the first embodiment, a shaping surface 211 of the stage 210 facing the nozzle opening 62 of the nozzle 61 is disposed to be parallel to the X and Y directions, that is, the horizontal direction. The stage 210 includes a stage heater 212 for preventing the shaping material discharged onto the stage 210 from being suddenly cooled. The stage heater 212 is controlled by the control unit 300.

The moving mechanism 230 changes relative positions of the stage 210 and the nozzle 61 under the control by the control unit 300. In this embodiment, the position of the nozzle 61 is fixed. The moving mechanism 230 moves the stage 210. The moving mechanism 230 is configured by a three-axis positioner that moves the stage 210 in three axial directions of the X, Y, and Z directions with driving forces of three motors. In this specification, unless particularly noted otherwise, the movement of the nozzle 61 means that the nozzle 61 and the discharging unit 60 are moved relatively to the stage 210.

In another embodiment, instead of the configuration in which the stage 210 is moved by the moving mechanism 230, a configuration in which the moving mechanism 230 moves the nozzle 61 with respect to the stage 210 in a state in which the position of the stage 210 is fixed may be adopted. Further, a configuration in which the stage 210 is moved in the Z direction by the moving mechanism 230 and the nozzle 61 is moved in the X and Y directions may be adopted. A configuration in which the stage 210 is moved in the X and Y directions by the moving mechanism 230 and the nozzle 61 is moved in the Z direction may be adopted. Even in these configuration, it is possible to change the relative positional relation between the nozzle 61 and the stage 210.

The control unit 300 is a device that controls an operation of the entire three-dimensional shaping apparatus 100. The control unit 300 is configured by a computer including one or a plurality of processors 310, a storage unit 320 including a main storage unit and an auxiliary storage unit, and an input and output interface that performs input and output of signals to and from the outside. The processor 310 executes a computer program stored in the storage unit 320 to thereby control the shaping unit 110 and the moving mechanism 230 to shape a model on the stage 210 according to shaping data stored in the storage 320. Instead of being configured by the computer, the control unit 300 may be realized by a configuration in which circuits are combined.

Figure 5:
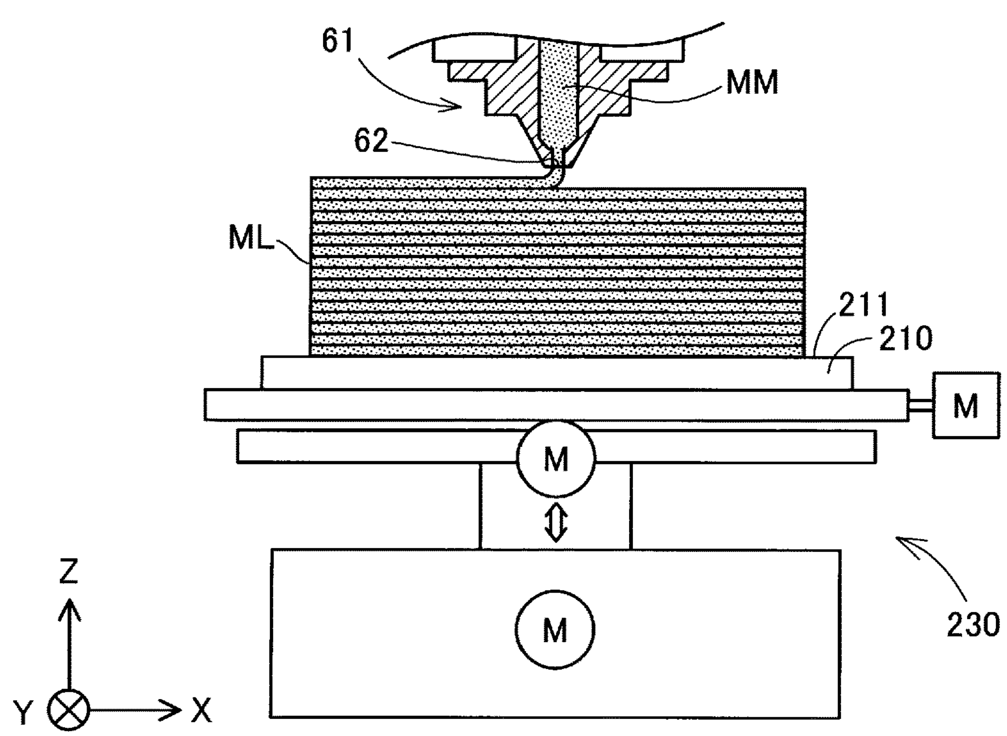
FIG. 5 is an explanatory diagram schematically showing a state in which the three-dimensional shaping apparatus shapes a model.

FIG. 5 is an explanatory diagram schematically showing a state in which the three-dimensional shaping apparatus 100 shapes a model. In the three-dimensional shaping apparatus 100, as explained above, the raw material MR in the solid state is plasticized to generate a shaping material MM. The control unit 300 causes the nozzle 61 to discharge the shaping material MM while, with the distance between the shaping surface 211 of the stage 210 and the nozzle 61 kept, changing the position of the nozzle 61 with respect to the stage 210 in a direction along the shaping surface 211 of the stage 210. The shaping material MM discharged from the nozzle 61 is continuously deposited in a moving direction of the nozzle 61.

The control unit 300 repeats the movement of the nozzle 61 to form a layer ML. After forming one layer ML, the control unit 300 relatively moves the position of the nozzle 61 with respect to the stage 210 in the Z direction. The control unit 300 further stacks the layer ML on the layers ML formed to that point to shape a model.

In some case, for example, the control unit 300 sometimes temporarily stops the movement in the Z direction of the nozzle 61 when the formation of one layer ML is completed or temporarily stops the discharge of the shaping material from the nozzle 61 when there are a plurality of shaping regions independent in each layer. In this case, the control unit 300 causes the discharge adjusting unit 70 to close the flow path 65 and stop the discharge of the shaping material MM from the nozzle opening 62 and causes the suction unit 75 to temporarily suck the shaping material in the nozzle 61. After changing the position of the nozzle 61, while discharging the shaping material in the suction unit 75, the control unit 300 opens the flow path 65 with the discharge adjusting unit 70 to thereby resume the deposit of the shaping material MM from the position of the nozzle 61 after the change.

Figure 6:
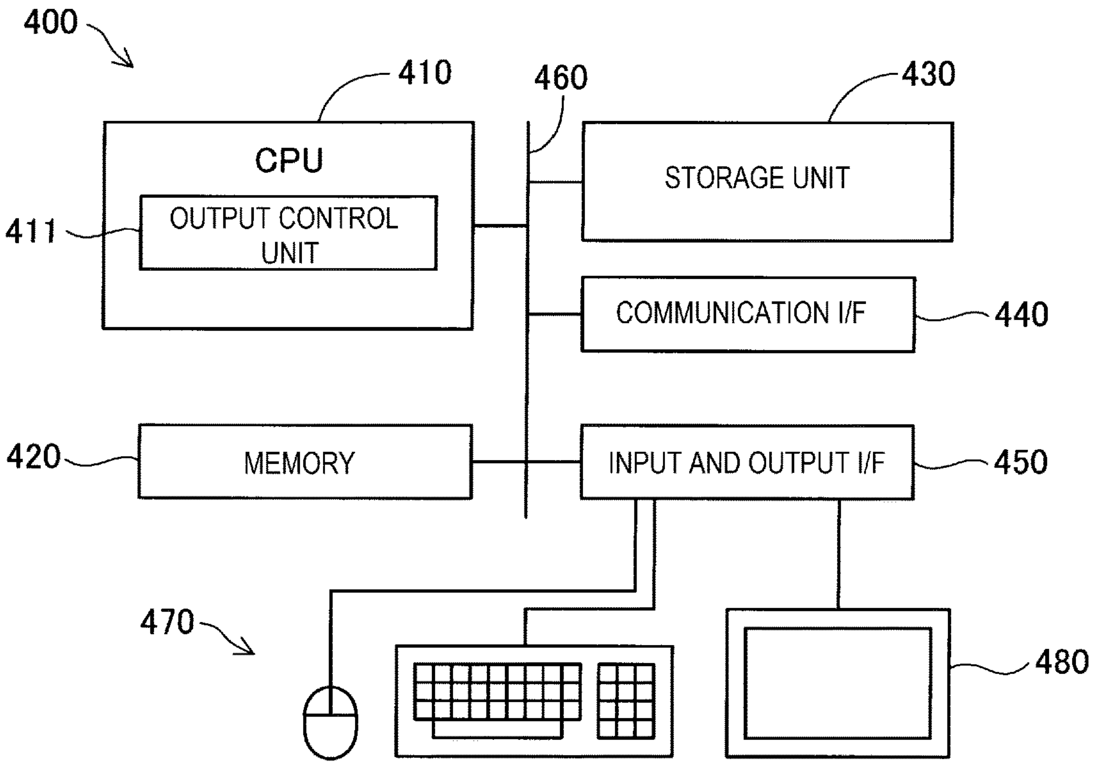
FIG. 6 is an explanatory diagram showing a schematic configuration of an information processing apparatus.

FIG. 6 is an explanatory diagram showing a schematic configuration of the information processing apparatus 400. The information processing apparatus 400 is configured as a computer in which a CPU 410, a memory 420, a storage unit 430, a communication interface 440, and an input and output interface 450 are connected to one another by a bus 460. An input device 470 such as a keyboard or a mouse and a display unit 480 such as a liquid crystal display are connected to the input and output interface 450.

The information processing apparatus 400 is connected to the control unit 300 of the three-dimensional shaping apparatus 100 via the communication interface 440. For example, information representing a residual amount of a material put in the material supply unit 20 of the three-dimensional shaping apparatus 100, information representing progress of a model being shaped, information representing a use time, information indicating a used material amount, information representing the number of times of cleaning of the nozzle 61, and information representing a used electric energy amount are transmitted from the control unit 300 to the information processing apparatus 400. For example, shaping data in which a shaping time is scheduled in the information processing apparatus 400 and a signal for controlling opening and closing of the door 106 included in the three-dimensional shaping apparatus 100 are transmitted from the information processing apparatus 400 to the control unit 300.

The CPU 410 functions as an output control unit 411 by executing a computer program stored in the storage unit 430. The output control unit 411 has an output function for outputting various kinds of information stored in the storage unit 430 referring to the storage unit 430. In this embodiment, the output control unit 411 outputs the various kinds of information through the input and output interface 450 and causes the display unit 480 to display the various kinds of information.

Figure 7:
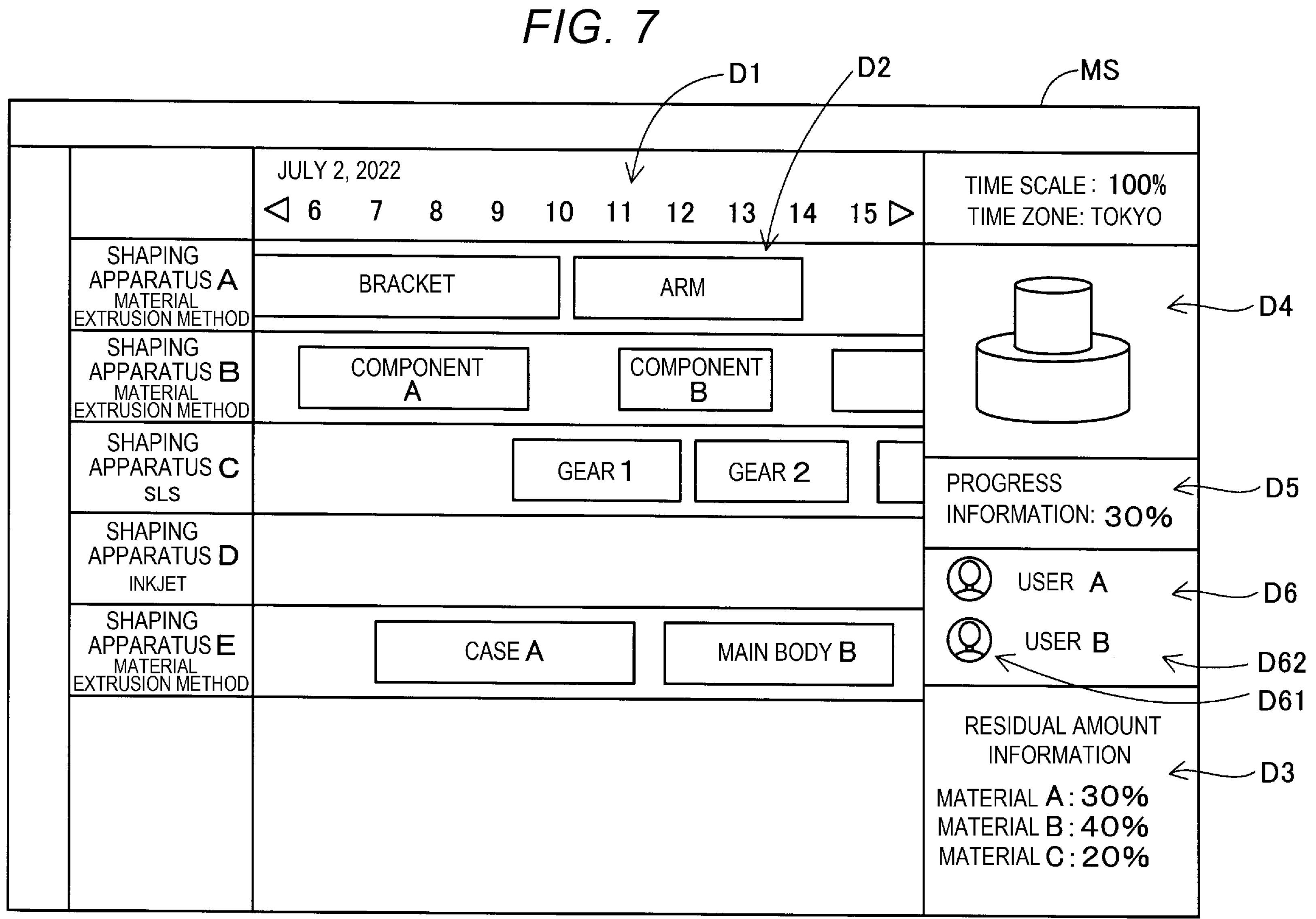
FIG. 7 is a diagram showing an example of a management scree.

FIG. 7 is a diagram showing an example of a management screen MS displayed on the display unit 480 by the output control unit 411. The output control unit 411 refers to the storage unit 430 and outputs time information D1, operation information D2, and residual amount information D3 stored in the storage unit 430 to the display unit 480 and causes the display unit 480 to display the time information D1, the operation information D2, and the residual amount information D3. The time information D1 is information representing time. The operation information D2 includes information representing a shaping time for a model in the three-dimensional shaping apparatuses 100. The shaping time for the model includes shaping start time and shaping end time. In this embodiment, the shaping end time is time when cooling of the model after shaping is completed. The shaping start time and the shaping end time are represented by the time information D1. That is, the operation time D2 is stored in the storage unit 430 in association with the time information D1. In FIG. 7, an example is shown in which a time required for shaping of the model is displayed in a belt shape for each of the three-dimensional shaping apparatuses 100 as the operation information D2 and a name of the model is displayed in the belt. One piece of the operation information D2 is equivalent to one printing job in the three-dimensional shaping apparatus 100. The residual amount information D3 is information representing a residual amount of a material used in a selected three-dimensional shaping apparatus 100 among the plurality of three-dimensional shaping apparatuses 100. The user can select any three-dimensional shaping apparatus 100 using the input device 470 from a list of the three-dimensional shaping apparatuses 100 displayed on the left side of the management screen MS. In this embodiment, as explained above, the shaping end time is the time when the cooling of the model is completed. However, the shaping end time may be time when the shaping of the model is completed.

The output control unit 411 displays the operation information D2 in association with the time information D1. That is, the output control unit 411 displays the time information D1 and the operation information D2 side by side along a common time axis. The user can scroll and display the time information D1 and the operation information D2 in the left-right direction of the management screen MS by using the input device 470. On the management screen MS shown in FIG. 7, a time zone of time represented by time information and a scale of the time can be designated. The user can designate the time zone and the scale of the time using the input device 470. The time zone means an entire region where a common standard time is adopted. The scale of the time means a scale of a time axis on a screen. When a time zone is designated, the output control unit 411 displays the time information D1 according to the designated time zone. When the scale of the time is changed, the output control unit 411 enlarges or reduces the lengths along the time axes of the time information D1 and the operation information D2. Only one of the time zone and the scale may be able to be designated. The time zone and the scale may be able to be respectively set on screens different from the management screen MS shown in FIG. 7.

The output control unit 411 in this embodiment further refers to the storage unit 430 and outputs model information D4, progress information D5, and user information D6 stored in the storage unit 430 to the display unit 480 and causes the display unit 480 to display the model information D4, the progress information D5, and the user information D6. The model information D4 is information representing a shape of a model corresponding to the operation information D2. The progress information D5 is information representing a progress degree of a model being shaped in a selected three-dimensional shaping apparatus 100. The user information D6 is information concerning a user corresponding to the operation information D2 or the three-dimensional shaping apparatus 100. In this embodiment, the model information D4 and the user information D6 are included in the operation information D2. That is, in this embodiment, the operation information D2 includes information representing a shaping time of a model, the user information D6 representing a user of the model, and the model information D4 representing a shape of the model.

When any operation information D2 among a plurality of kinds of operation information D2 displayed on the management screen MS is selected by the input device 470, the output control unit 411 displays, as the model information D4, a shape of a model corresponding to the operation information D2 and displays, as the user information D6, a user of the model corresponding to the operation information D2. The user information D6 includes at least one of face information D61 and name information D62 of the user. The face information D61 means information representing a face of the user. The face information D61 is, for example, an image obtained by imaging the face of the user with a camera. The face image D61 only has to be capable of distinguishing the user and may be an image of an iconized or illustrated face. The name information D62 is information representing a name of the user. The name of the user may be a real name or may be a nickname or a handle name. The name of the user may be a full name or may be a part of the name.

When any three-dimensional shaping apparatus 100 among the plurality of three-dimensional shaping apparatuses 100 displayed as the list on the left side of the management screen MS is selected, the output control unit 411 displays, as the progress information D5, information representing progress of a model being shaped in the three-dimensional shaping apparatus 100. When any operation information D2 among the plurality of kinds of operation information D2 displayed on the management screen MS is selected by the input device 470, the output control unit 411 may display the progress information D5 representing progress of a model corresponding to the operation information D2. When any three-dimensional shaping apparatus 100 among the plurality of three-dimensional shaping apparatuses 100 displayed as the list on the left side of the management screen MS is selected, the output control unit 411 may display, as the model information D4, a shape of a model being shaped in the three-dimensional shaping apparatus 100 and display a user of the model as the user information D6.

The output control unit 411 does not need to display all of the time information D1, the operation information D2, the residual amount information D3, the model information D4, the progress information D5, and the user information D6 shown in FIG. 7. For example, at least one of the residual amount information D3, the model information D4, and the progress information D5 may not be displayed.

Figure 8:
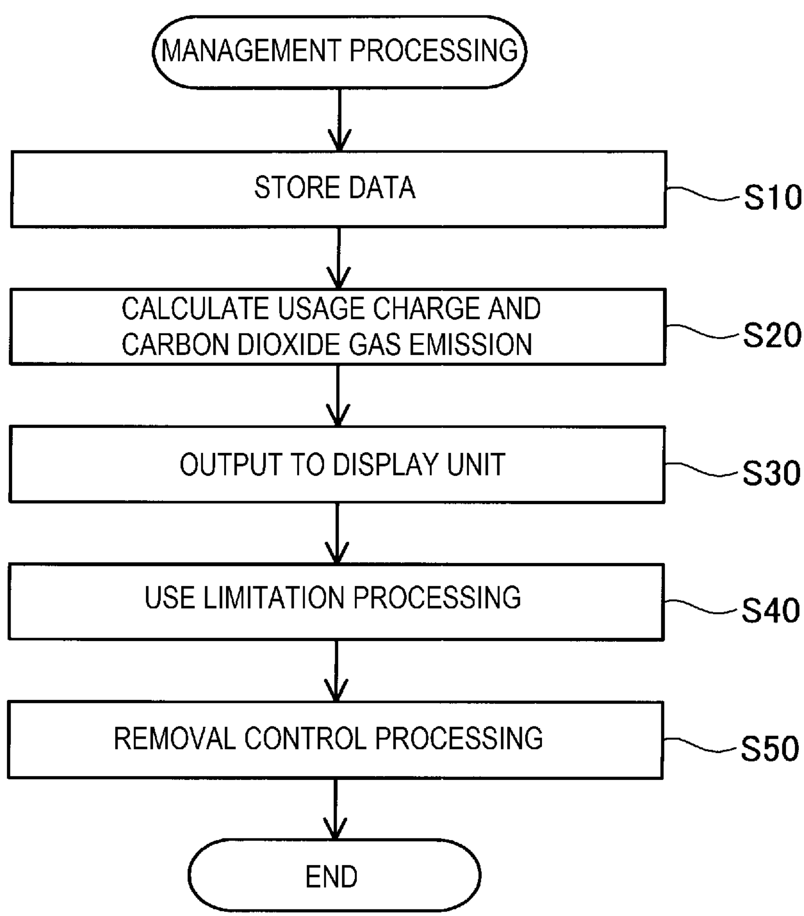
FIG. 8 is a flowchart of management processing.

FIG. 8 is a flowchart of management processing repeatedly executed by the CPU 410 of the information processing apparatus 400. The management processing is processing for the information processing apparatus 400 to manage the three-dimensional shaping apparatus 100.

In step S10, the CPU 410 of the information processing apparatus 400 acquires various kinds of information used for the management of the three-dimensional shaping apparatus 100 from the three-dimensional shaping apparatus 100 or the information processing apparatus 400 itself and causes the storage unit 430 to store the various kinds of information.

FIG. 9 is a diagram showing an example of the various kinds of information stored in the storage unit 430. As shown in FIG. 9, for example, a cumulative use time for each of the three-dimensional shaping apparatuses 100, a cumulative used material amount for each of the three-dimensional shaping apparatuses 100, a cumulative number of times of cleaning for each of the three-dimensional shaping apparatuses 100, a cumulative used electric energy amount for each of the three-dimensional shaping apparatuses 100, the number of simultaneously usable apparatuses, and a model-removable waiting time for each of the three-dimensional shaping apparatuses 100 are stored for each of users in the storage unit 430. Among these kinds of information, cumulative values such as the cumulative use time, the cumulative used material amount, and the cumulative number of times of cleaning are calculated by accumulating, for a predetermined period, values acquired from the three-dimensional shaping apparatus 100 by the CPU 410. The CPU 410 resets these cumulative values at predetermined timing such as a month end, a quarter, a component replacement time, or an expense payment time.

Among the kinds of information explained above, the number of simultaneously usable apparatuses is the number of three-dimensional shaping apparatuses 100 that users can simultaneously use. The number of simultaneously usable apparatuses may be the same number of apparatuses for each of the users or may be a different number of apparatuses for each of the users. For example, the number of simultaneously usable apparatuses may be increased for a user who pays a more usage charge.

The model-removable waiting time is a waiting time in which, after a model is shaped, the model can be removed from the three-dimensional shaping apparatus 100. An initial value of the model-removable waiting time is, for example, one hour. The model-removable waiting time decreases as time elapses until the model is removed from the three-dimensional shaping apparatus 100 after the shaping of the model is completed. Like the cumulative values explained above, the model-removable waiting time is reset to an initial value at predetermined timing such as a month end, a quarter, a component replacement time, or an expense payment time. The initial value of the model-removable waiting time may be the same value for each of the users or may be a different value for each of the users. For example, the initial value may be increased for a user who pays a more usage charge.

In FIG. 9, the various kinds of information are stored for each of the users and for each of the three-dimensional shaping apparatuses 100. However, for example, when the number of three-dimensional shaping apparatuses 100 included in the three-dimensional shaping system 10 is one, the various kinds of information only has to be stored for each of the users and may not be stored for each of the three-dimensional shaping apparatuses 100.

FIG. 10 is a diagram showing an example in which the various kinds of information are managed for each of groups. In FIG. 9, an example is shown in which the various kinds of information are stored in the storage unit 430 for each of the users. However, the various kinds of information may be stored in the storage unit 430 for each of groups to which pluralities of users belong.

In step S20 in FIG. 8, the CPU 410 calculates a value concerning a usage charge or carbon dioxide gas emission of the three-dimensional shaping apparatus 100 for each of the users based on at least any one of the cumulative use time, the cumulative used material amount, the cumulative number of times of cleaning, and the cumulative used electric energy amount stored in the storage unit 430 and causes the storage unit 430 to store the value.

FIG. 11 is a diagram showing a list of a usage charge and carbon dioxide gas emission of the three-dimensional shaping apparatus 100. The CPU 410 calculates the usage charge by, for example, adding up an amount obtained by multiplying a usage charge per unit time of the three-dimensional shaping apparatus 100 by the cumulative use time, an amount obtained by multiplying a unit price of a material by the cumulative used material amount, an amount of expendables consumed per one time of cleaning, and an amount obtained by multiplying consumed power per unit time of the three-dimensional shaping apparatus 100 by the cumulative use time. The CPU 410 calculates the carbon dioxide gas emission by, for example, multiplying the cumulative used electric energy amount by carbon dioxide gas emission per unit power. The CPU 410 may calculate share ratios of usage charges of the users as the value concerning the usage charge. The CPU 410 may calculate carbon dioxide gas emission ratios of the users as the value concerning the carbon dioxide gas emission.

FIG. 12 is a diagram showing an example in which various ratios are calculated for each of the groups. In FIG. 11, an example is shown in which the usage charge and the carbon dioxide gas emission are calculated for each of the users. However, as shown in FIG. 12, the information processing apparatus 400 may calculate a share ratio of the usage charge and a carbon dioxide gas emission ratio for each of the groups. In FIG. 12, share ratios of apparatus management expenses and share ratios of material expenses are shown as the share ratios of the usage charge. The share ratios of the apparatus management expenses are calculated according to, for example, the cumulative use time for each of the groups. The share ratios of the material expenses are calculated according to the cumulative used material amount of for each of the groups. The apparatus management expenses include, for example, purchase expenses, maintenance expenses, and component replacement expenses of the three-dimensional shaping apparatus 100.

In step S30 in FIG. 8, the output control unit 411 refers to the storage unit 430 and outputs the various kinds of information shown in FIGS. 9 to 12 to the display unit 480 and causes the display unit 480 to display the various kinds of information. For example, the output control unit 411 may cause the display unit 480 to display the various kinds of information in table formats shown in FIGS. 9 and 10 or may cause the display unit 480 to display the various kinds of information in various forms such as a pie graph, a bar graph, and a line graph. In step S30, the output control unit 411 outputs the management screen MS shown in FIG. 7 to the display unit 480. The display unit 480 may simultaneously display the management screen MS shown in FIG. 7 and the various kinds of information shown in FIGS. 9 to 12 or may display the management screen MS and the various kinds of information to be switchable. The step in step S30 is referred to as output step as well.

In step S40, the CPU 410 executes use limitation processing. In the use limitation processing, when a cumulative use time of the three-dimensional shaping apparatus 100 by one user or one group has exceeded a predetermined use time (for example, 24 hours), the CPU 410 limits use of the three-dimensional shaping apparatus 100 by the one user or the one group.

Figure 13:
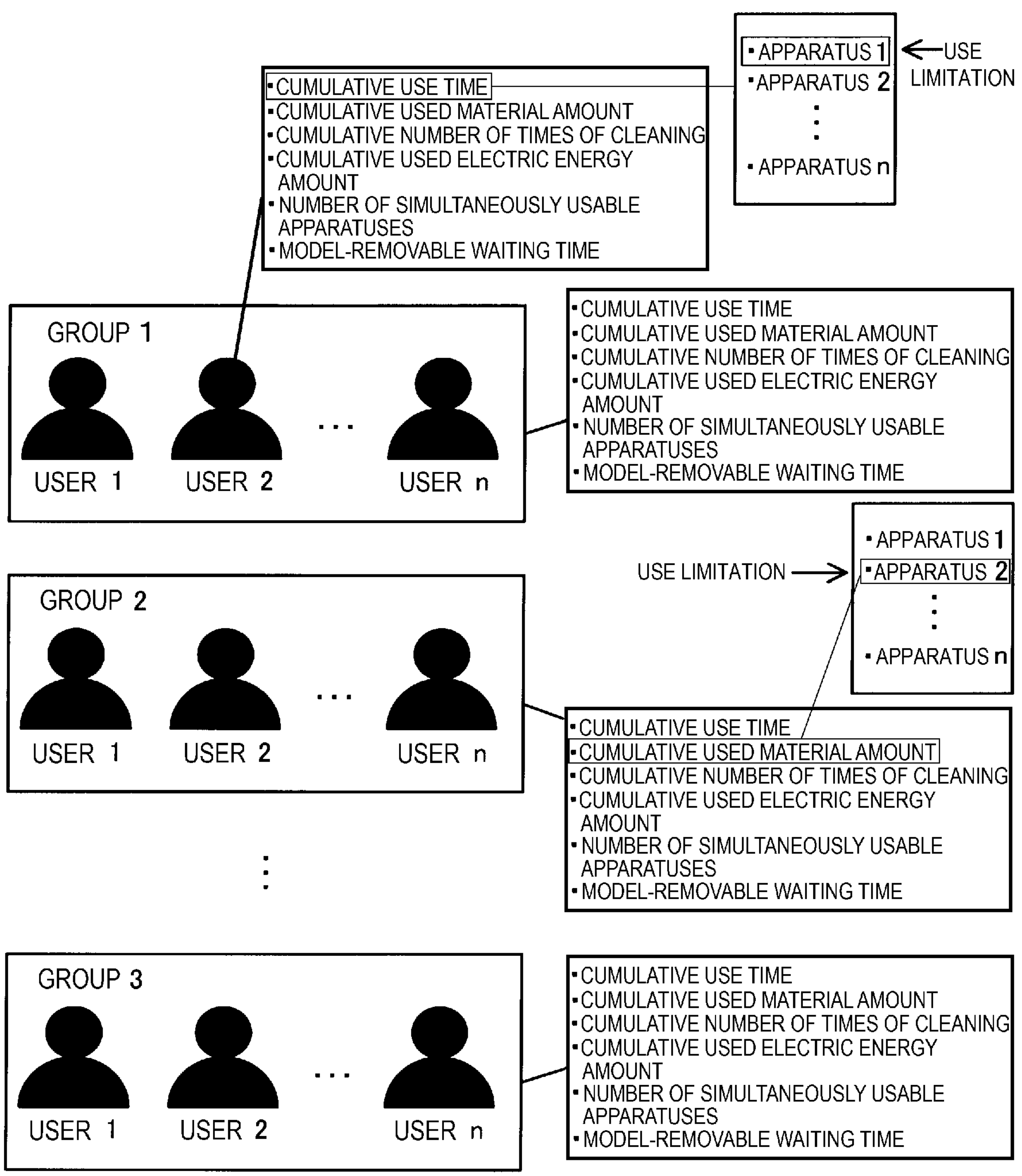
FIG. 13 is a first explanatory diagram of use limitation processing.

FIG. 13 is a first explanatory diagram of the user limitation processing. In FIG. 13, a state is shown in which, since a cumulative use time of an "apparatus 1" by a "user 2" belonging to a "group 1" has exceeded the predetermined use time, the use of the "apparatus 1" is temporarily limited. In the use limitation processing, the CPU 410 may compare not only the cumulative use time but also a cumulative used material amount or a cumulative used electric energy amount and a predetermined value and perform the use limitation. In FIG. 13, a state is shown in which, since a cumulative used material amount of a material used in the "apparatus 2" by the entire "group 2" has exceeded a predetermined amount, the use of the "apparatus 2" by the "group 2" is temporarily limited. The CPU 410 releases the use limitation for the apparatuses at timing when the cumulative values are reset.

Figure 14:
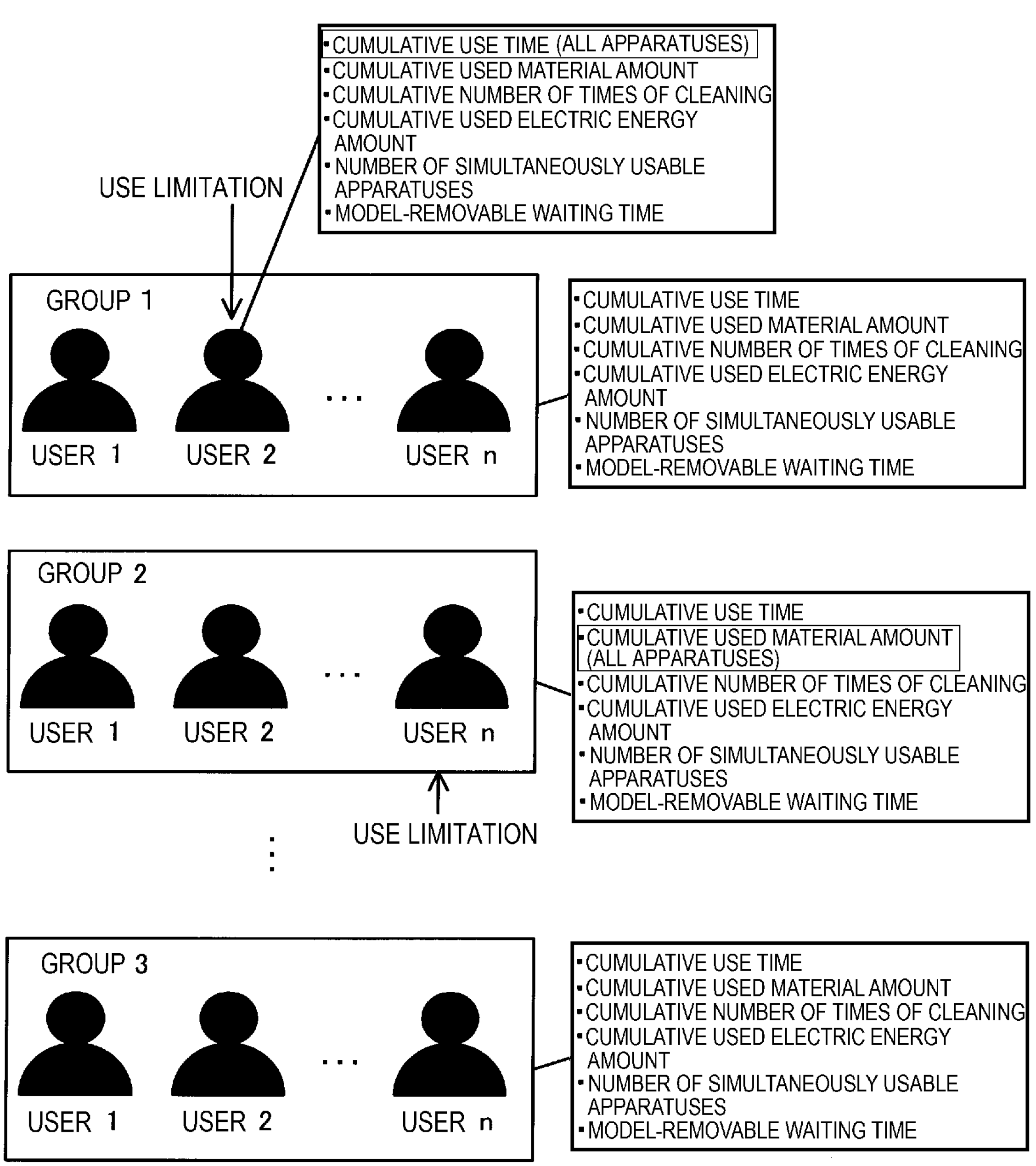
FIG. 14 is a second explanatory diagram of the use limitation processing.

FIG. 14 is a second explanatory diagram of the use limitation processing. In FIG. 13, the example is shown in which the use limitation is performed for each of the three-dimensional shaping apparatuses 100. In contrast, in FIG. 14, a state is shown in which, since the cumulative use time of the "user 2" belonging to the "group 1" has exceeded the predetermined use time, use of all apparatuses by the user 2 is temporarily limited. In FIG. 14, a state is shown in which, since the cumulative used material amount has exceeded the predetermined use amount in the entire "group 2", use of all the apparatuses by the entire group 2 is temporarily limited.

In step S40 explained above, the CPU 410 further limits the number of three-dimensional shaping apparatuses 100 in use for each of the users based on the number of simultaneously usable apparatuses stored in the storage unit 430. Specifically, when the number of three-dimensional shaping apparatuses 100 used by one user has reached the number of simultaneously shapable apparatuses predetermined for the user, the CPU 410 limits use of the other three-dimensional shaping apparatuses 100 by the user.

The use limitation processing in step S40 explained above can be realized by various methods. The use limitation can be performed by a method of:

(1) disabling a use limitation target user or group to log in to the information processing apparatus 400 that transmits shaping data to the three-dimensional shaping apparatus 100;

(2) emitting warning when scheduling a shaping time in the information processing apparatus 400; or (3) emitting warning when instructing the three-dimensional shaping apparatus 100 to perform shaping from the information processing apparatus 400. The number of simultaneously usable apparatuses may be decided for each of the groups. In this case, in step S40 explained above, the CPU 410 limits the number of three-dimensional shaping apparatuses 100 in use for each of the groups based on the number of simultaneously usable apparatuses for each of the groups stored in the storage unit 430.

In step S50 in FIG. 8, the CPU 410 executes removal control processing.

Figure 15:
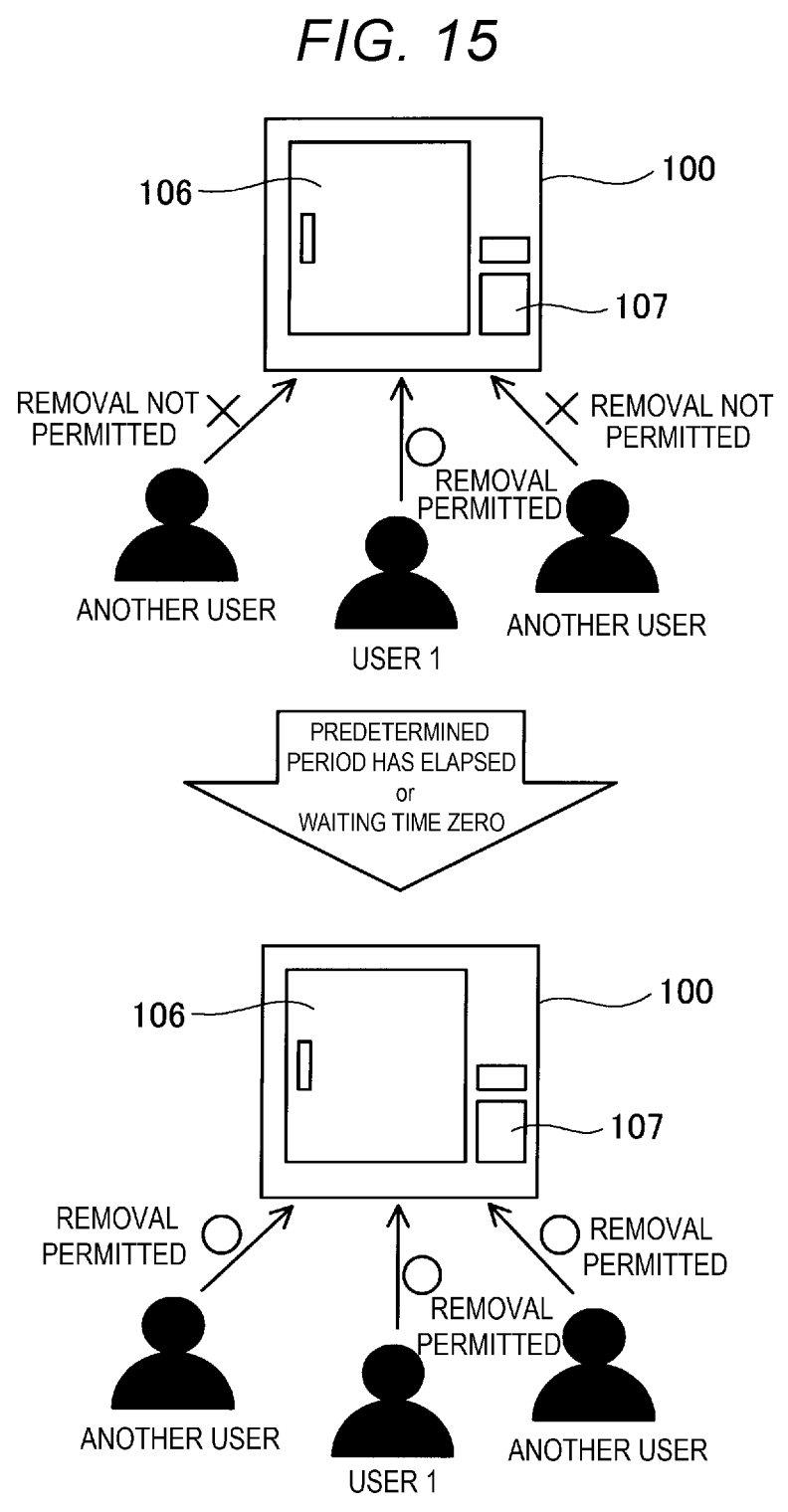

FIG. 15 is an explanatory diagram of the removal control processing. In the removal control processing, in a predetermined period (for example, ten minutes) after shaping of a model by one user or when a model-removable waiting time of the user remains, as shown in an upper part of FIG. 15, after authentication of the user, the CPU 410 enables a door included in the three-dimensional shaping apparatus 100 to be opened and permits removal of the model by the user. The authentication of the user is performed by, for example, an authentication device 107 included in the three-dimensional shaping apparatus 100. As a method of the authentication, various methods such as password authentication and biological authentication can be applied. Not only the removal of the model by the user but also removal of the model by another user authenticated from the user may be permitted. Specifically, after authenticating that another user is authenticated from the user, the CPU 410 may enable the door included in the three-dimensional shaping apparatus 100 to be opened and permit the removal of the model by other user authenticated from the user.

In contrast, when a predetermined period has been exceeded after the shaping of the model by the user or when a model-removable waiting time of the user has run out, as shown in a lower part of FIG. 15, the CPU 410 enables the door 106 included in the three-dimensional shaping apparatus 100 to be opened without performing the user authentication to permit removal of the model by an unspecified user. The user authentication and the opening control for the door 106 are realized by the information processing apparatus 400 and the three-dimensional shaping apparatus 100 exchanging information and commands and performing a cooperated operation.

FIG. 16 is a diagram showing the various kinds of information used in the management processing explained above and a correspondence relation among processing contents realized by the information. As shown in FIG. 16, the cumulative use time, the cumulative used material amount, the cumulative number of times of cleaning, and the cumulative used electric energy amount can be respectively used for calculation of a usage charge, calculation of a maintenance period, and use limitation of an apparatus. The cumulative used electric energy amount can be used for calculation of carbon dioxide gas emission. The number of simultaneously usable apparatuses can be used for the use limitation processing. The model-removable waiting time can be used for the removal control processing.

According to the first embodiment explained above, the time information D1, the operation information D2, the user information D6, and the like are displayed on the display unit 480 by the information processing apparatus 400. The user information D6 includes at least one of face information and name information of the user. The time information D1 is displayed in a designated scale or a designated time zone. Therefore, the user can efficiently manage the three-dimensional shaping apparatus 100 by checking the various kinds of information displayed on the display unit 480.

In this embodiment, at least one of the model information D4 of the model corresponding to the operation information and the progress information D5 representing the progress degree of the shaping of the model is displayed on the display unit 480. Therefore, the user can manage the three-dimensional shaping apparatus 100 while checking these kinds of information.

In this embodiment, at least any one of the cumulative use time, the cumulative used material amount, the cumulative number of times of cleaning, the cumulative used electric energy amount, the model-removable waiting time, and the number of simultaneously shapable apparatuses is displayed on the display unit 480 for each of the users or the groups. Therefore, it is possible to manage the three-dimensional shaping apparatus 100 while checking the various kinds of information output for each of the users or the groups.

In this embodiment, at least any one of the cumulative use time, the cumulative used material amount, the cumulative number of times of cleaning, the cumulative used electric energy amount, and the model-removable waiting time is displayed on the display unit 480 for each of the users or the groups and each of the three-dimensional shaping apparatuses 100. Therefore, it is possible to manage the three-dimensional shaping apparatus 100 while checking the various kinds of information output for each of the users or the groups and for each of the three-dimensional shaping apparatuses 100.

In this embodiment, the usage charge or the value concerning the carbon dioxide gas emission for each of the users or the groups calculated based on at least one of the cumulative use time, the cumulative used material amount, the cumulative number of times of cleaning, and the cumulative used electric energy amount is displayed on the display unit 480. Therefore, it is possible to manage the three-dimensional shaping apparatus 100 while checking the usage charge or the carbon dioxide gas emission for each of the users or the groups.

In this embodiment, when the cumulative use time of the three-dimensional shaping apparatus 100 by one user or one group has exceeded the predetermined use time, use of the three-dimensional shaping apparatus 100 by the user or the group is limited. Therefore, it is possible to prevent the three-dimensional shaping apparatus 100 from being occupied by a specific user or group.

In this embodiment, when the number of three-dimensional shaping apparatuses 100 used by one user or one group has reached the predetermined simultaneously shapable apparatuses, use of the other three-dimensional shaping apparatuses 100 by the user or the group is limited. Therefore, it is possible to prevent the plurality of three-dimensional shaping apparatuses 100 from being occupied by a specific user or group.

In this embodiment, in the predetermined period after the shaping of the model by one user or when the model-removable waiting time of the user remains, after authentication of the user, the door 106 included in the three-dimensional shaping apparatus 100 is enabled to be opened and removal of the model by the user is permitted. When the predetermined period has been exceeded after the shaping of the model by the user or when the model-removable waiting time of the user has run out, the door 106 of the three-dimensional shaping apparatus 100 is enabled to be opened without the authentication being performed and removal of the model by an unspecified user is permitted. Therefore, after the shaping of the model, it is possible to prevent removal of the model by an outsider from being performed within a fixed period. Since removal of the model is not performed even after the fixed period elapses, it is possible to prevent other users from being unable to use the three-dimensional shaping apparatus 100.

B. Other Embodiment (B1) In the embodiment explained above, a part of the steps of the management processing shown in FIG. 8 may not be executed. Fr example, a part or all of the calculation of the usage charge and the carbon dioxide gas emission in step S20, the use limitation processing in step S40, and the removal control processing in step S50 may not be executed. In the embodiment explained above, the execution of the management processing shown in FIG. 8 may be omitted and the management screen MS shown in FIG. 7 may be output.

(B2) In the embodiment explained above, the output control unit 411 outputs the management screen MS and the various kinds of information to the display unit 480 through the input and output interface 450 and causes the display unit 480 to display the management screen MS and the various kinds of information. In contrast, the output control unit 411 may output the management screen MS and the various kinds of information to the other apparatuses through the communication interface 440.

(B3) In the embodiment explained above, the various kinds of information are stored in the storage unit 430 included in the information processing apparatus 400. In contrast, the various kinds of information may be stored in a storage unit included in another apparatus or a server accessible through the communication interface 440.

(B4) In the embodiment explained above, the plurality of three-dimensional shaping apparatuses 100 may adopt different shaping methods. The shaping methods are, for example, a material extrusion method, an inkjet method, a DMD (Direct Metal Deposition) method, and a binder jet method.

(B5) In the embodiment explained above, the shaping unit 110 plasticizes the material with the flat screw 40. In contrast, the shaping unit 110 may plasticize the material, for example, by rotating an inline screw. The shaping unit 110 may plasticize a filament-like material with a heater.

C. Other Aspects

The present disclosure is not limited to the embodiments explained above and can be realized in various configurations not departing from the gist of the present disclosure. For example, technical features of the embodiments corresponding to technical features in aspects described below can be substituted and combined as appropriate in order to solve a part or all of the problems described above or in order to achieve a part or all of the effects described above. Unless the technical features are explained as essential technical features in this specification, the technical features can be deleted as appropriate.

(1) According to a first aspect of the present disclosure, there is provided a management method for a three-dimensional shaping apparatus. The management method includes an output step for referring to a storage unit that stores time information representing time, operation information including information representing a shaping time for a model in the three-dimensional shaping apparatus, and user information corresponding to the operation information or the three-dimensional shaping apparatus and outputting the time information, the operation information, and the user information. The operation information is stored in the storage unit in association with the time information. The user information includes at least one of face information and name information of a user. In the output step, the time information is output in a designated scale or a designated time zone. According to such an aspect, it is possible to efficiently manage the three-dimensional shaping apparatus by checking the output various kinds of information.

(2) The aspect explained above may include outputting at least one of model information of the model corresponding to the operation information and progress information representing a progress degree of shaping of the model. According to such an aspect, it is possible to manage the three-dimensional shaping apparatus while checking the model information and the progress degree of the shaping.

(3) The aspect explained above may include outputting at least any one of a cumulative use time, a cumulative used material amount, a cumulative number of times of cleaning, a cumulative used electric energy amount, a model-removable waiting time, and a number of simultaneously shapable apparatuses of the three-dimensional shaping apparatus for each the user or each group to which a plurality of the users belong. According to such an aspect, it is possible to manage the three-dimensional shaping apparatus while checking the output various kinds of information for each of users or groups.

(4) The aspect explained above may include outputting at least any one of a cumulative use time, a cumulative used material amount, a cumulative number of times of cleaning, a cumulative used electric energy amount, and a model-removable waiting time for each the user or each group to which a plurality of the users belong and for each the three-dimensional shaping apparatus. According to such an aspect, it is possible to manage the three-dimensional shaping apparatus while checking the output various kinds of information for each of users or groups and for each of three-dimensional shaping apparatuses.

(5) The aspect explained above may include outputting a value concerning a usage charge or carbon dioxide gas emission for each the user or each group to which a plurality of the users belong calculated based on at least any one of a cumulative use time, a cumulative used material amount, a cumulative number of times of cleaning, and a cumulative used electric energy amount of the three-dimensional shaping apparatus. According to such an aspect, it is possible to manage the three-dimensional shaping apparatus while checking a usage charge or carbon dioxide gas emission for each of users or each of groups.

(6) The aspect explained above may include, when a cumulative use time of the three-dimensional shaping apparatus by a singularity of the user or one group to which a plurality of the users belong exceeded a predetermined use time, limiting use of the three-dimensional shaping apparatus by the one user or the one group. According to such an aspect, it is possible to prevent the three-dimensional shaping apparatus from being occupied by a specific user or group.

(7) The aspect explained above may include, when a number of three-dimensional shaping apparatuses used by a singularity of the user or one group to which a plurality of the users belong reached a predetermined number of simultaneously shapable apparatuses, limiting use of other three-dimensional shaping apparatuses by the one user or the one group. According to such an aspect, it is possible to prevent a plurality of three-dimensional shaping apparatuses from being occupied by a specific user or group.

(8) The aspect explained above may include: in a predetermined period after shaping of a model by a singularity of the user or when a model-removable waiting time of the one user remains, enabling a door included in the three-dimensional shaping apparatus to be opened after authentication of the one user or the user having authentication and permitting removal of the model by the one user or the user having the authentication; and, when the predetermined period was exceeded after the shaping of the model by the one user or when the model-removable waiting time of the one user run out, enabling the door of the three-dimensional shaping apparatus to be opened without performing the authentication and permitting removal of the model by an unspecified user. According to such an aspect, it is possible to prevent the model from being removed by an outsider within a fixed period after the shaping of the model and prevent other users from being unable to use the three-dimensional shaping apparatus because the model is not removed even after the fixed period elapses.

The present disclosure is not limited to the management method for the three-dimensional shaping apparatus explained above and can be realized by various forms such as an information processing apparatus for managing the three-dimensional shaping apparatus, a computer program for managing the three-dimensional shaping apparatus, and a non-transitory tangible recording medium recording the computer program to be readable by a computer.

What is claimed is:

1. A management method for a three-dimensional shaping apparatus comprising:

referring to a storage unit that stores time information representing time, operation information including information representing a shaping time for a model in the three-dimensional shaping apparatus, residual amount information representing a residual amount of a material used in the three-dimensional shaping apparatus, model information representing a shape of the model corresponding to the operation information, progress information representing a progress degree of the model being shaped in the three-dimensional shaping apparatus, and user information corresponding to the operation information and the three-dimensional shaping apparatus;

outputting the time information, the operation information, the residual amount information, the model information, the progress information, and the user information;

displaying the time information, the operation information, the residual amount information, the model information, the progress information, and the user information on a screen of a display; and managing an operation of the three-dimensional shaping apparatus based on the time information, the operation information, the residual amount information, the model information, the progress information, and the user information, wherein the operation information is stored in the storage unit in association with the time information, the user information includes a picture of a face and a name of a user, and the time information is output in a designated scale and a designated time zone.

2. The management method according to claim 1, further comprising outputting model information of the model corresponding to the operation information and progress information representing a progress degree of shaping of the model.

3. The management method according to claim 1, further comprising outputting a cumulative use time, a cumulative used material amount, a cumulative number of times of cleaning, a cumulative used electric energy amount, a model-removable waiting time, and a number of simultaneously shapable apparatuses of the three-dimensional shaping apparatus for each group to which a plurality of the users respectively belong.

4. The management method according to claim 1, further comprising outputting a cumulative use time, a cumulative used material amount, a cumulative number of times of cleaning, a cumulative used electric energy amount, and a model-removable waiting time for each group to which a plurality of the users respectively belong and for each of the three-dimensional shaping apparatus.

5. The management method according to claim 1, further comprising outputting a value concerning a usage charge and carbon dioxide gas emission for each group to which a plurality of the users respectively belong calculated based on a cumulative use time, a cumulative used material amount, a cumulative number of times of cleaning, and a cumulative used electric energy amount of the three-dimensional shaping apparatus.

6. The management method according to claim 1, further comprising limiting use of the three-dimensional shaping apparatus by each group to which a plurality of the users respectively belong under a condition below:

a cumulative use time of the three-dimensional shaping apparatus by the each group has exceeded a predetermined use time.

7. The management method according to claim 1, further comprising limiting use of remaining other three-dimensional shaping apparatuses of the three-dimensional shaping apparatuses by each group to which a plurality of the users respectively belong under a condition below:

a number of some of the three-dimensional shaping apparatuses used by the each group has reached a predetermined number.

8. The management method according to claim 1, wherein in a predetermined period after shaping of the model by a first user of the plurality of the users and during remaining of a model-removable waiting time of the first user, a door included in the three-dimensional shaping apparatus is configured to be opened after authentication of the first user, and removal of the model by the first user is permitted, and the door of the three-dimensional shaping apparatus is configured to be opened without performing the authentication and the removal of the model by another user of the plurality of the user is permitted under conditions below:

the predetermined period has been exceeded after the shaping of the model by the first user; and the model-removable waiting time of the first user has run out.

* * * * *